United States Patent
Lewis et al.

(10) Patent No.: US 9,342,384 B1
(45) Date of Patent: May 17, 2016

(54) FUNCTION CALLBACK MECHANISM BETWEEN A CENTRAL PROCESSING UNIT (CPU) AND AN AUXILIARY PROCESSOR

(71) Applicant: Intel Corporation, Santa Clara, CA (US)

(72) Inventors: Brian T. Lewis, Palo Alto, CA (US); Rajkishore Barik, Santa Clara, CA (US); Tatiana Shpeisman, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/574,545

(22) Filed: Dec. 18, 2014

(51) Int. Cl.
  *G06F 13/00* (2006.01)
  *G06F 9/54* (2006.01)
  *G06T 1/20* (2006.01)

(52) U.S. Cl.
  CPC .. *G06F 9/544* (2013.01); *G06T 1/20* (2013.01)

(58) Field of Classification Search
  CPC .................................. G06F 9/544; G06F 9/546
  USPC .................................................. 719/312, 314
  See application file for complete search history.

(56) References Cited

U.S. PATENT DOCUMENTS

| 8,745,291 B2* | 6/2014 | Tsadik | G06F 9/544 710/53 |
| 2004/0078812 A1 | 4/2004 | Calvert | |
| 2005/0044551 A1* | 2/2005 | Sodhi | G06F 9/546 719/312 |
| 2006/0161737 A1 | 7/2006 | Martin et al. | |
| 2012/0158817 A1 | 6/2012 | Lauderdale et al. | |
| 2013/0328891 A1 | 12/2013 | Lyashevsky | |

OTHER PUBLICATIONS

International Search Report and Written Opinion from related application PCT/US2015/062302, mailed Feb. 29, 2016.
Jeff A. Stuart et al., "GPU-to-CPU Callbacks," In: Proceedings of the 2010 conference on Parallel processing (Euro-Par 2010), ISBN:978-3-642-21877-4, Sep. 3, 2010, Retrieved from: <http://www.bing.com/search?q=GPU-to-CPU+calabacks%2C+pdf&goE%EC%BF%BC%EB%A6%AC+%EC%A0%84%EC%86%A1&qs=bs&form=QBRE>.

* cited by examiner

*Primary Examiner* — Andy Ho
(74) *Attorney, Agent, or Firm* — Grossman, Tucker, Perreault & Pfleger, PLLC (57) ABSTRACT

Generally, this disclosure provides systems, devices, methods and computer readable media for implementing function callback requests between a first processor (e.g., a GPU) and a second processor (e.g., a CPU). The system may include a shared virtual memory (SVM) coupled to the first and second processors, the SVM configured to store at least one double-ended queue (Deque). An execution unit (EU) of the first processor may be associated with a first of the Deques and configured to push the callback requests to that first Deque. A request handler thread executing on the second processor may be configured to: pop one of the callback requests from the first Deque; execute a function specified by the popped callback request; and generate a completion signal to the EU in response to completion of the function.

25 Claims, 7 Drawing Sheets

FUNCTION CALLBACK MECHANISM BETWEEN A CENTRAL PROCESSING UNIT (CPU) AND AN AUXILIARY PROCESSOR

FIELD

The present disclosure relates to function callback requests from an auxiliary processor, for example a Graphics Processing Unit (GPU), to a Central Processing Unit (CPU), and more particularly, to efficiency improvements for such callback requests.

BACKGROUND

Heterogeneous processing systems, for example processors that combine a CPU and GPU (or auxiliary processor or accelerator) on a chip, are becoming increasingly common. In addition to performing graphics processing, the GPU may be used to offload computational tasks, which are relatively parallel intensive, from the CPU. Because GPU architectures are typically oriented to parallel computations, the GPU may be able to provide higher performance and lower energy consumption for these types of tasks, compared to the CPU. Support for function calls from the CPU to the GPU, in both hardware and software, is becoming more available.

While these heterogeneous processors and programming frameworks may allow the CPU to offload work to the GPU, there is typically no corresponding mechanism for the GPU to offload work back onto the CPU. Such a capability may be useful in many situations including, for example, (1) invoking an operating system function that may not be run on the GPU, (2) calling code that has not yet been ported to the GPU, and (3) executing code that is relatively sequential or follows an irregular control path that is less suitable for parallel execution.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for function calls and callbacks between an auxiliary processor (e.g., a GPU or other type of accelerator) and a Central Processing Unit (CPU), with improved efficiency including reduced latency. A heterogeneous processor may include one or more GPUs and CPUs that are configured to access a shared virtual memory (SVM). The CPUs may generate function call requests to the GPUs to offload work on to the GPUs. The GPUs may in turn generate function callback requests to the CPUs to execute selected portions of that workload. The callback requests may be communicated through double-ended queues stored in the SVM, as will be explained in greater detail below. The callback requests may include: a pointer (e.g., a memory address) to the callback function to be executed on the CPU; a pointer to data to be provided to and/or returned by the callback function; and additional information related to one or more callback completion mechanisms including signaling flags and continuation kernels.

Figure 1:
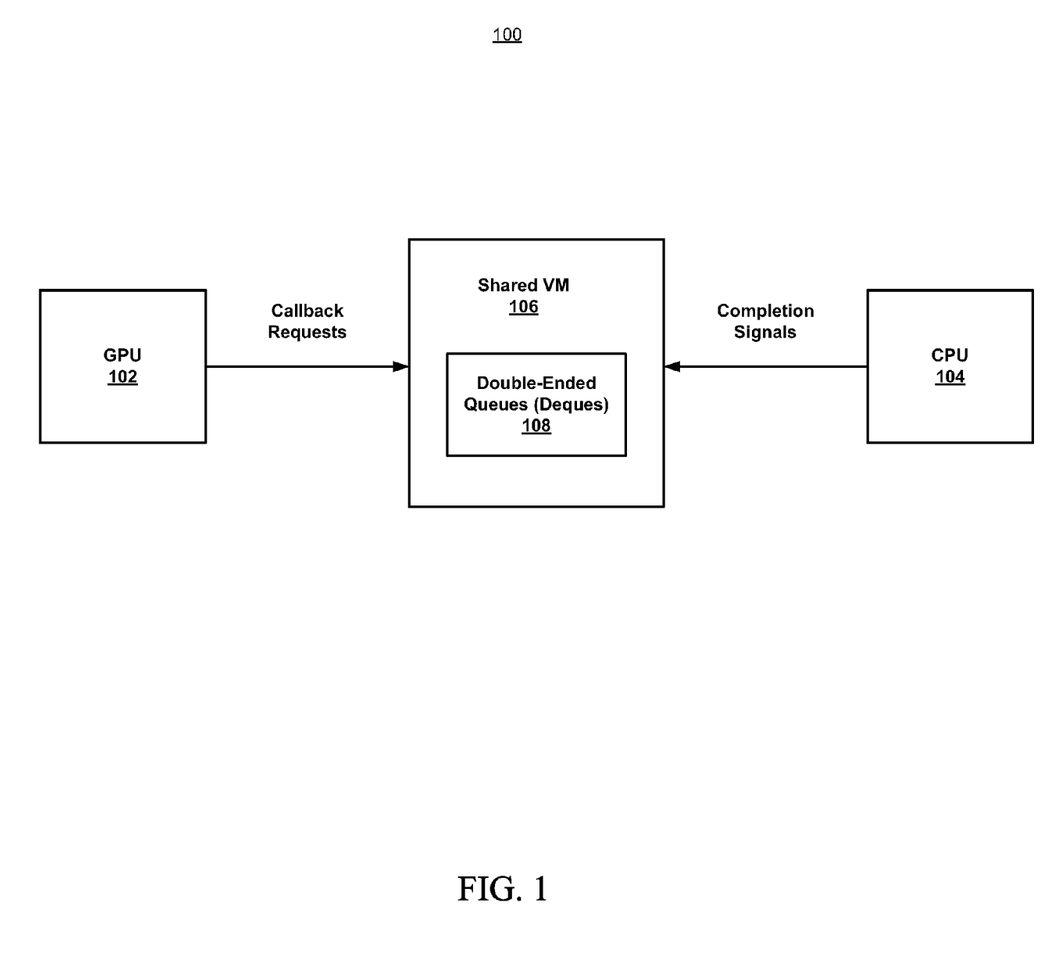
FIG. 1 illustrates a top level system diagram of an example embodiment consistent with the present disclosure.

FIG. 1 illustrates a top level system diagram 100 of one example embodiment consistent with the present disclosure. One or more GPUs (or GPU cores) 102 are configured to share a virtual memory (SVM) 106 with one or more CPUs 104. The GPUs 102 and CPUs 104 may be part of a heterogeneous processor or system on a chip (SoC), in which work may be shared between the processors. For example a CPU, which is a more general purpose processor, may be better suited to handle tasks that execute in a relatively sequential (or irregular) flow, while a GPU, which is designed with a more parallel architecture, may be more suited to handle parallel computational tasks. The CPUs 104 may be configured to generate function call requests to the GPUs 102 to offload work on to the GPUs that is suited to the GPU architecture. The GPUs 102 may be configured to generate function callback requests to the CPUs 104 to execute selected portions of that workload that are better suited to the CPU architecture. Upon completion of the callback requests, the CPU 104 may generate a completion signal to the GPU 102 that initiated the request.

The SVM 106 may be configured to enable the CPUs 104 and GPUs 102 to transparently share pointers containing data structures and to provide memory consistency so that a GPU can see updates made by a CPU and vice versa. The SVM 106 may also be configured to provide atomic operations and fence operations to coordinate access to the shared memory and prevent conflicts between the CPUs 104 and the GPUs 102.

The callback requests and completion signals may be communicated through double-ended queues (Deques) 108 stored in the SVM 106. A queue is a type of data structure configured to hold multiple data elements. A double-ended queue (or Deque) is a queue that is configured such that data elements may be added to, or removed from, either the head or tail ends of the queue. The head end of the Deque may also be referred to as the "front" or "top" end while the tail end may be referred to as the "back" or "bottom" end. The head and tail designations are used merely as convenient reference points in the description of operation of the Deque and do not refer to fixed physical locations. In other words, the terms head and tail may be interchanged throughout the following description without changing the meaning or operation of any embodiments of the disclosure. In some embodiments, the Deque may be implemented as a circular or ring buffer to allow for more efficient size adjustments if required.

The operation of adding data to (or writing to) the Deque may be referred to as "pushing" data onto one end of the Deque. The operation of removing data from (or reading from) the Deque may be referred to as "popping" data from the other end of the Deque. As will be explained in greater detail below, the GPUs 102 may push callback requests onto the Deques 108 and the CPUs may pop them off for execution.

Figure 2:
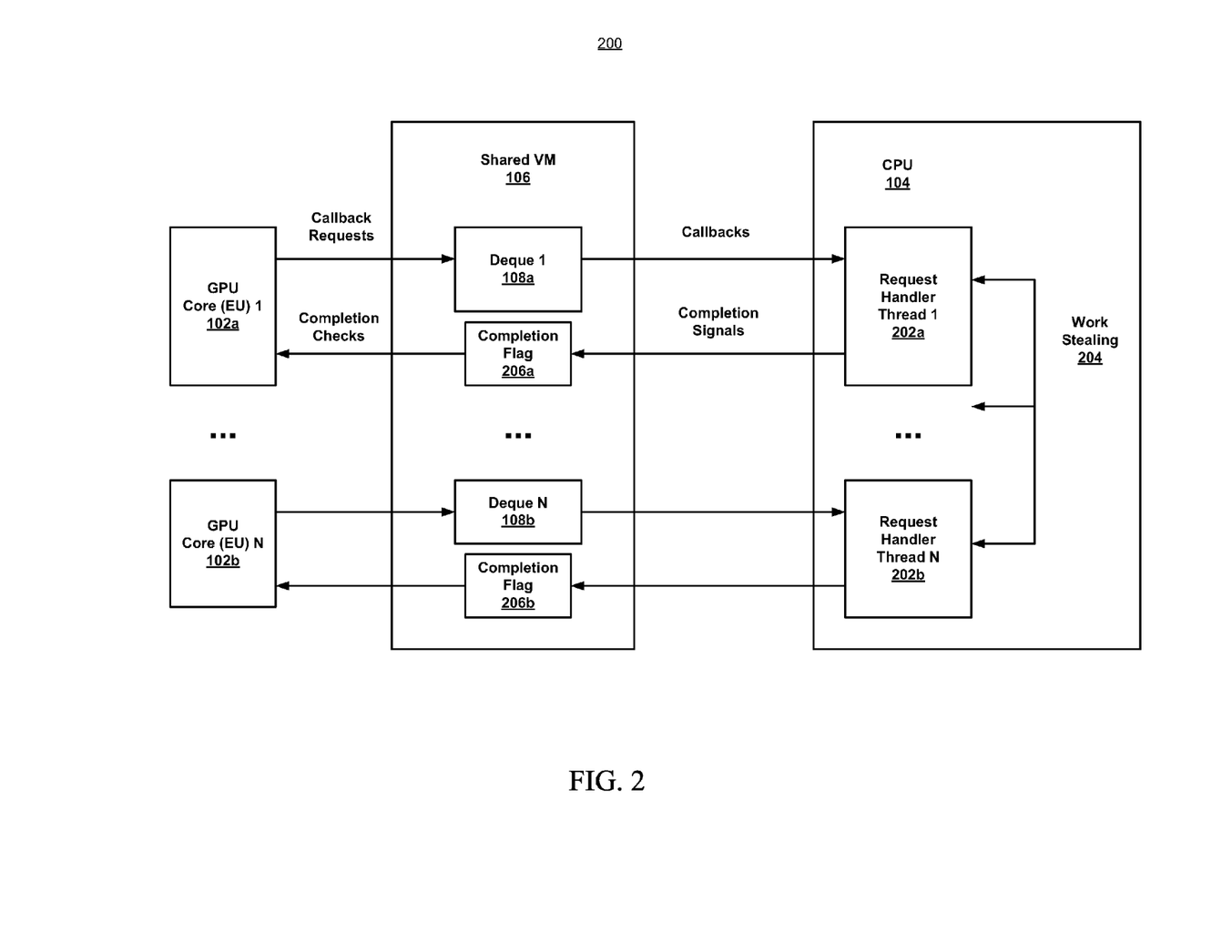
FIG. 2 illustrates a block diagram of one example embodiment consistent with the present disclosure.

FIG. 2 illustrates a block diagram 200 of one example embodiment consistent with the present disclosure, where the system of FIG. 1 is shown in greater detail. The GPU 102 is shown to include any number of cores or execution units (EUs) 102a, 102b which may be configured, for example, to perform tasks in parallel. These tasks may be associated with function calls from the CPU 104 that are intended to offload work from the CPU to the GPUs. Tasks executing on the GPU cores or EUs 102 may in turn request function callbacks to the CPU 104.

The CPU 104 is shown to include any number of callback request handler threads (also referred to as callback worker threads) 202a, 202b which execute on the CPU processor. The shared virtual memory (SVM) 106 may be configured to store any number of Deques 108a, 108b, although typically there will be one Deque for each GPU core and one request handler thread for each Deque to avoid contention and reduce latency. In some embodiments, the SVM 106 may also be configured to store completion flags 206a, 206b. The GPU tasks executing on a particular core (e.g., 102a) may request a function callback to the CPU 104 by pushing a callback request on to the Deque associated with that core 108a. The callback requests may include: a pointer to the callback function to be executed on the CPU and a pointer to arguments for the function. The argument pointer may typically be a pointer to a data structure containing multiple data items and parameters including one or more memory locations, into which the CPU may write return results.

The request handler thread 202a on the CPU may subsequently pop a callback request from that Deque and execute the function associated with that callback request. Upon completion of that callback request function, the request handler thread may generate a completion signal. In some embodiments, the completion signal may be accomplished by performing an atomic operation to set a completion flag 206a (a Boolean variable) in the SVM 106. The completion flag 206 may be specified by a pointer in the callback request. The GPU task may periodically monitor the completion flag 206a (using an atomic operation), for example while performing other tasks, to determine when the callback request has been completed. Thus, the GPU is not stalled during execution of the callback by the CPU.

In some embodiments, the request handler threads 202 may steal work from each other 204 when they become idle, for example when their own Deque becomes empty. This may be accomplished by randomly selecting an alternative Deque from which to pop one or more callback requests. Work stealing in this manner may spread the work more efficiently among a number of request handler threads.

In some embodiments, efficiency may further be increased by pinning or locking down the Deques 108 in SVM 106 to avoid page faults by either the CPUs or the GPUs. If Deques grow in size, the additional storage is also pinned. In addition, work queuing may be performed at the user level (e.g., through atomic operations on the SVM) to avoid the overhead associated with ring transitions to the operating system (OS) or the GPU driver.

One Deque may be allocated for each GPU core (or EU), to be shared by the tasks executing on that EU. Since the bottom end of the Deque is only accessed by that EU, data locality is improved and contention is reduced since different EUs (or GPU sub-slices) are prevented from contending for the cache lines associated with that Deque.

Configuring the CPU with one dedicated request handler thread per Deque may help to avoid Deque backups caused by long-running CPU code. While the Deque contains remaining callback requests, this CPU thread will continue with their execution. If the Deque becomes empty however, the CPU thread will attempt to steal items from other randomly chosen Deques. If the CPU thread is unable to successfully steal a callback request after and allowed number of steal attempts, then it will pause for a certain period of time to avoid the cost associated with further unsuccessful attempts. If Monitor/Mwait instructions are available at the user level (ring 3), the CPU thread may use them to wait until new items are added to the Deque. Otherwise, the CPU thread may sleep for a time period, and then restart its normal operation: executing its own callback requests or stealing from other Deques.

Figure 3:
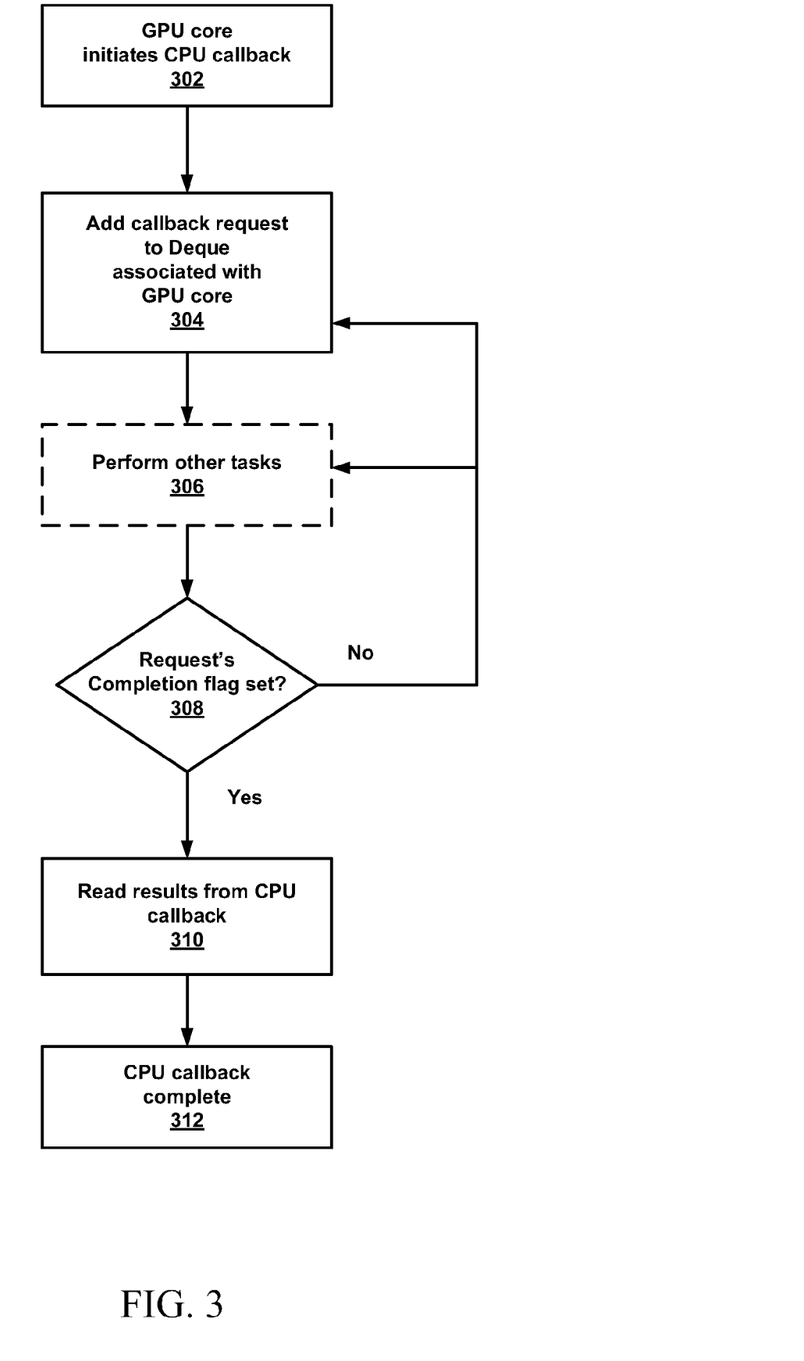
FIG. 3 illustrates a flowchart of operations of one example embodiment consistent with the present disclosure.

FIG. 3 illustrates a flowchart of operations 300 of one example embodiment consistent with the present disclosure. The operations of a GPU core or execution unit (EU) 102a, 102b are illustrated. At operation 302, the GPU core initiates a CPU callback. The callback request is added to the Deque associated with the GPU core at operation 304. The GPU core may then optionally, at operation 306, perform other tasks while waiting for completion of the callback. At operation 308, the completion flag 206 associated with the request is tested and if it is not set, the GPU may continue performing other tasks (306), add additional callback requests (304) or simply wait/sleep for a period of time prior to re-testing the completion flag. If/when the completion flag become set, then at operation 310, the GPU core reads results provided from the CPU callback. These results may be obtained at a memory location, for example in the SVM, which was specified by a pointer in the callback request. The CPU callback is completed at operation 312.

Figure 4:
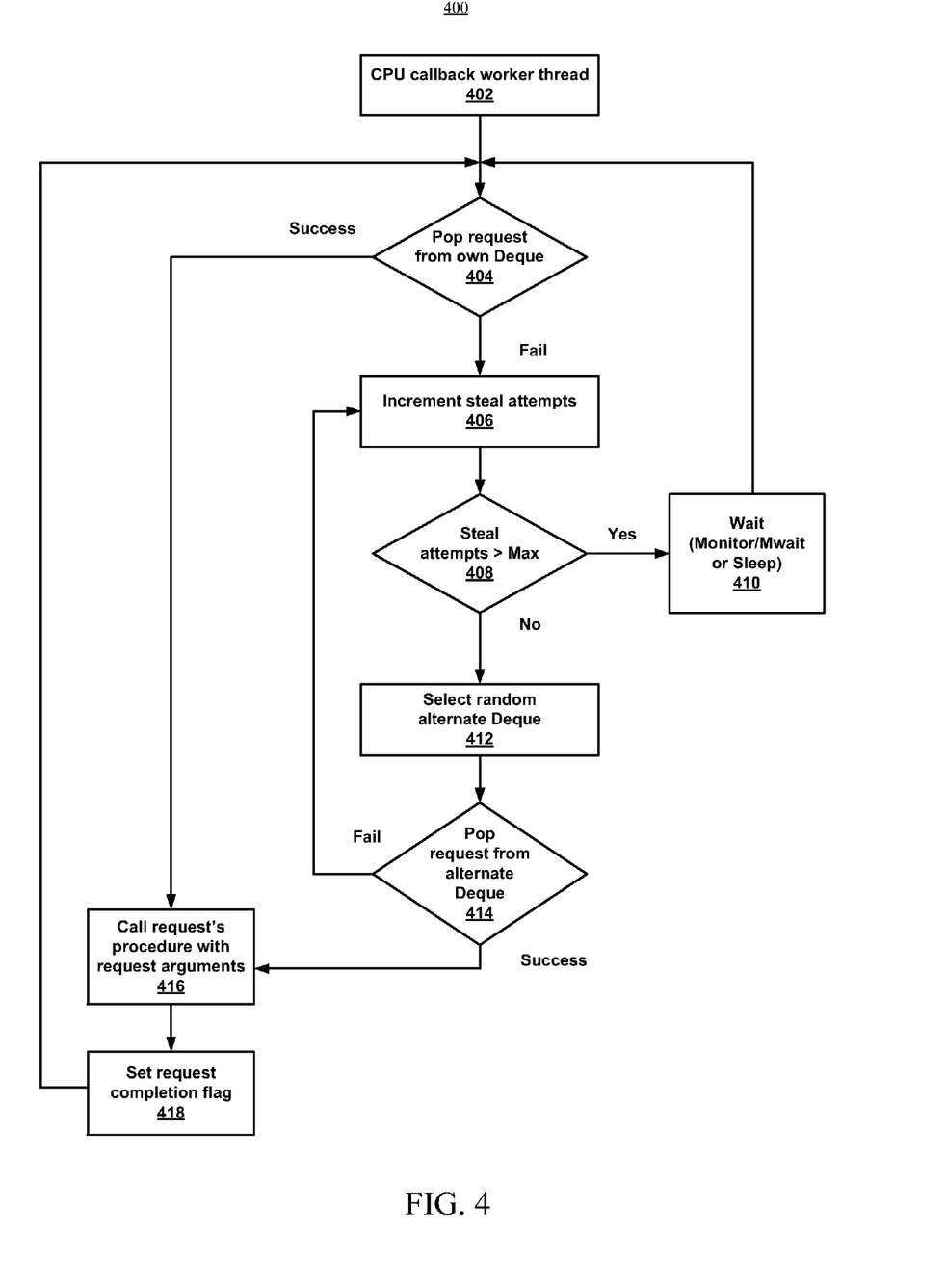
FIG. 4 illustrates a flowchart of operations of another example embodiment consistent with the present disclosure.

FIG. 4 illustrates a flowchart of operations 400 of another example embodiment consistent with the present disclosure. The operations of a CPU callback worker thread 202a, 202b are shown to begin at operation 402. At operation 404, a callback request is popped from the Deque associated with that worker thread. If the callback request was successfully popped, then at operation 416 the function or procedure specified by the callback request is called/executed with any arguments that were supplied by the callback request. After the callback function completes, at operation 418, the completion flag associated with that callback request is set, and the worker thread loops back to operation 404 to handle the next callback request.

If, however, the pop fails, for example if there are no more callback requests in the Deque associated with that worker thread, then at operation 406 the number of steal attempts is incremented. If the number of steal attempts exceeds the maximum threshold, at operation 408, then the worker thread may wait, at operation 410, for some specified period of time before attempting another pop. In some embodiments, the wait may be accomplished by executing a Sleep instruction or a Monitor/Mwait instruction. Otherwise, if the number of steal attempts is less than the maximum threshold, at operation 412 an alternate Deque is selected at random (e.g., stolen) from among the other Deques that are associated with other worker threads. Then, at operation 414, a callback request is popped from the alternate (stolen) Deque and the procedure continues at operation 416 as described above.

Figure 5:
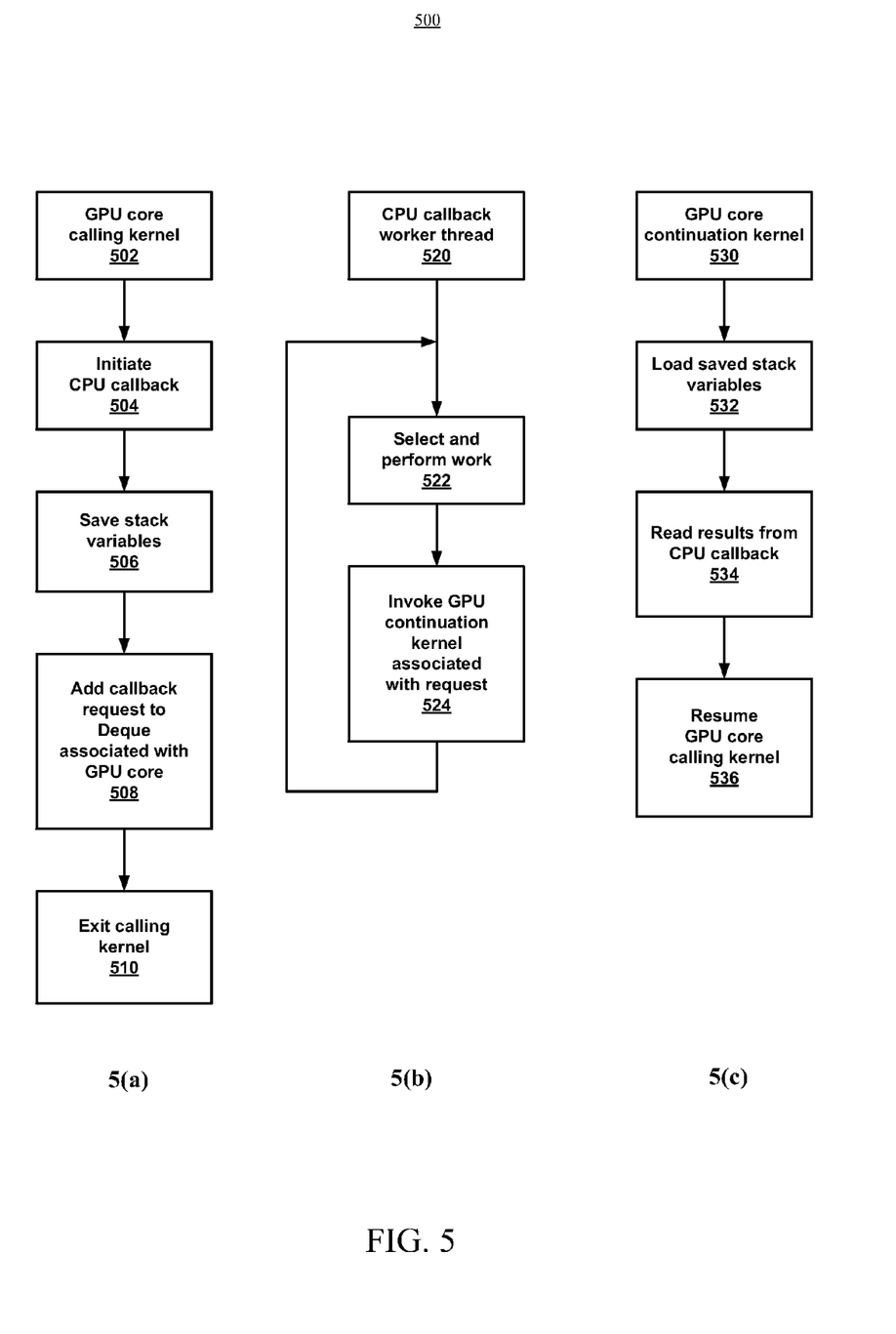
FIG. 5 illustrates a flowchart of operations of another example embodiment consistent with the present disclosure.

FIG. 5 illustrates a flowchart of operations 500 of another example embodiment consistent with the present disclosure. In this embodiment, an alternative mechanism is provided to avoid requiring the GPU to repeatedly check for callback request completions. This may improve GPU efficiency and energy consumption. The mechanism employs the use of a "continuation" which represents the state of a computation at a given point in a program. The callback request may be configured to include a pointer or handle to a GPU kernel called a "continuation kernel," which the CPU will invoke after completing the callback request. The GPU continuation kernel will then logically resume execution of the original GPU task (or calling kernel) at the point just after the callback request was made. Thus, the GPU calling kernel is not blocked and does not have to repeatedly check whether the CPU callback has completed. The callback request may also be configured to include a data pointer (e.g., a continuation argument pointer) to be passed back to the continuation kernel. Generally, the GPU calling kernel, making the callback request, will save the values of key variables in memory locations in the data structure referenced by the continuation argument pointer so that they can be used later by the continuation kernel. Additionally, if the CPU callback function is to return a result, it may do so by writing to memory locations in that data structure.

Referring now to FIG. 5(a) which describes the operation of the calling kernel 502 on the GPU core, at operation 504, the calling kernel initiates the CPU callback. At operation 506, stack variables are saved into the data structure referenced by the continuation argument pointer of the callback request. These stack variables will later be used by the continuation kernel to resume the calling kernel from the point at which it will be left off. At operation 508, the callback request is added to (pushed on to) the Deque associated with the GPU core or execution unit. At operation 510, the calling kernel on the GPU core may then exit, thus allowing, for example, the GPU core to perform other work. Although the calling kernel has now terminated, the continuation kernel can later resume the computations or tasks that were intended to occur after making the callback request, and do so directly without any need for the GPU to wait or perform repeated testing.

Referring now to FIG. 5(b), the operation of the CPU callback worker thread 520 is described. At operation 522, work is selected and performed in a manner similar to that which was described in connection with FIG. 4 above. Namely, a callback request is popped from the Deque associated with the worker thread and the specified callback function is executed. Upon completion, at operation 524, the CPU callback worker thread invokes the GPU continuation kernel that is associated with that callback request.

Referring now to FIG. 5(c), the operation of the GPU core continuation kernel 530 is described. The invoked continuation kernel loads the stack variables, at operation 532 that were previously saved by the calling kernel and reads the results, if any, from the CPU callback, at operation 534. At operation 536, the GPU core calling kernel is resumed using the restored stack variables.

In some embodiments, a programmer may implement the CPU callback request by writing the calling kernel's code needed to store the values of the stack variables as well as the continuation kernel's code to re-load those stack variable values. However, in other embodiments, a compiler or translator may be configured to emit this code and thus simplify the programming effort needed to use CPU callbacks. A compiler may additionally be configured to translate a single GPU kernel containing CPU callbacks into the appropriate sequence of calling and continuation kernels as well as the associated stack variable save and restore code, to further simplify the use of function callbacks.

Figure 6:
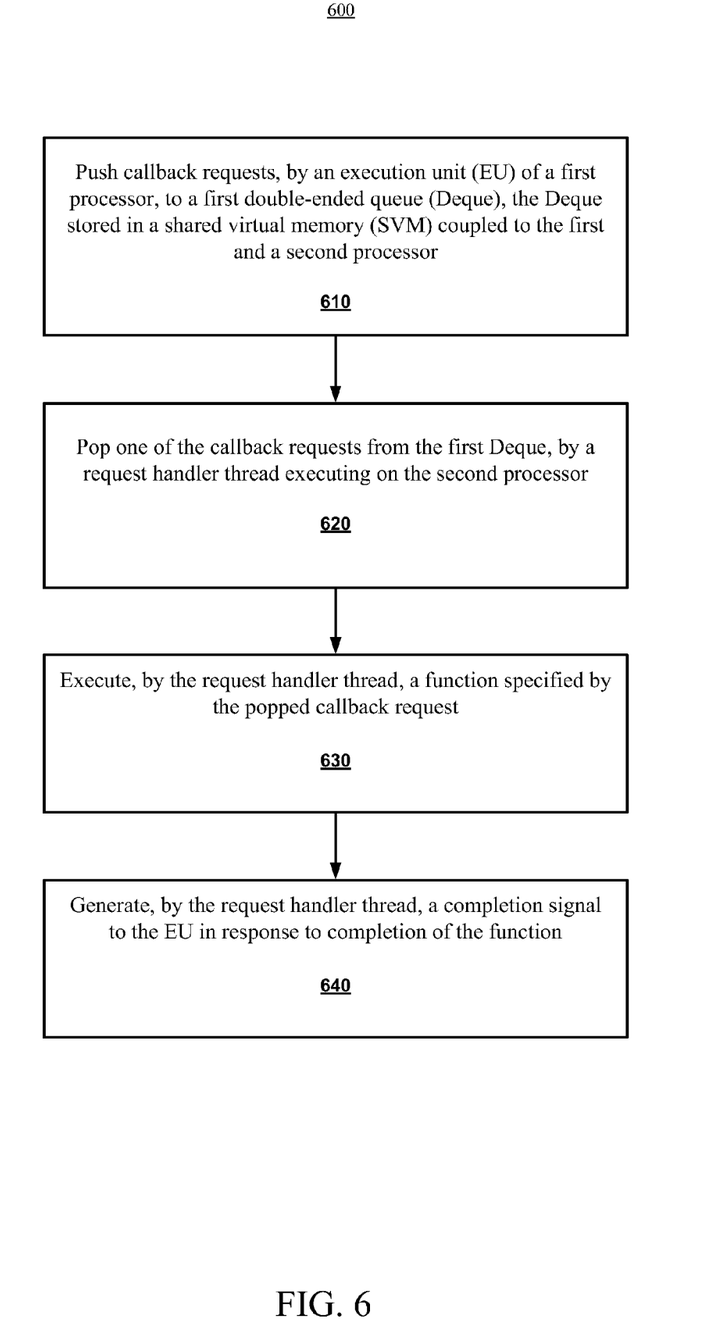
FIG. 6 illustrates a flowchart of operations of another example embodiment consistent with the present disclosure.

FIG. 6 illustrates a flowchart of operations 600 of another example embodiment consistent with the present disclosure. The operations provide a method for requesting function callbacks between a first processor and a second processor. At operation 610, the callback requests are pushed, by an execution unit (EU) of the first processor, to a first double-ended queue (Deque). The Deque is stored in a shared virtual memory (SVM) coupled to the first and second processors. At operation 620, one of the callback requests is popped from the first Deque by a request handler thread executing on the second processor. At operation 630, the request handler thread executes a function specified by the popped callback request. At operation 640, the request handler thread generates a completion signal to the EU in response to completion of the function.

Figure 7:
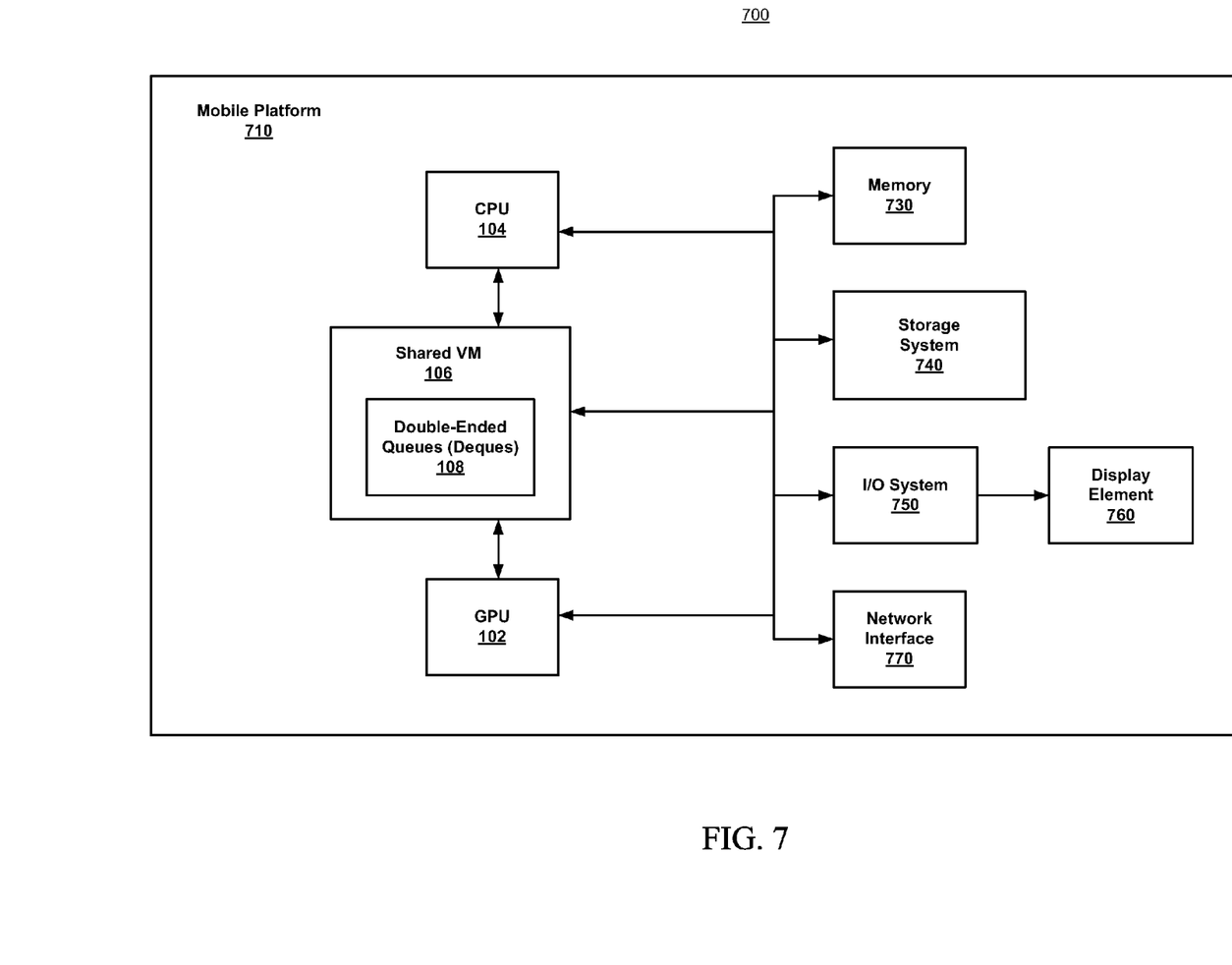
FIG. 7 illustrates a system diagram of a platform of another example embodiment consistent with the present disclosure.

FIG. 7 illustrates a system diagram 700 of one example embodiment consistent with the present disclosure. The system 700 may be a mobile platform 710 or computing device such as, for example, a smart phone, smart tablet, personal digital assistant (PDA), mobile Internet device (MID), convertible tablet, notebook or laptop computer, or any other suitable device. It will be appreciated, however, that embodiments of the system described herein are not limited to mobile platforms, and in some embodiments, the system 700 may be a workstation or desktop computer. The device may generally present various interfaces to a user via a display element 760 such as, for example, a touch screen, liquid crystal display (LCD) or any other suitable display type.

The system 700 is shown to include a first processor or CPU 104 which may be configured, for example, as a general purpose processor, and a second processor or GPU 102 which may be configured to execute parallel operations with greater efficiency. In some embodiments, the processors 102 and 104 may be implemented as any number of processor cores. In general, the processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. System 700 is also shown to include an SVM 106 including any number of Deques 108 configured to implement improved function callback requests between processors as described previously.

System 700 is shown to also include memory 730. The memory 730 may be coupled to the processors. The memory 730 may be any of a wide variety of memories (including various layers of memory hierarchy and/or memory caches) as are known or otherwise available to those of skill in the art. It will be appreciated that the processors and memory may be configured to store, host and/or execute one or more user applications or other software modules. These applications may include, but not be limited to, for example, any type of computation, communication, data management, data storage and/or user interface task. In some embodiments, these applications may employ or interact with any other components of the mobile platform 710.

System 700 is also shown to include an input/output (IO) system or controller 750 which may be configured to enable or manage data communication between processor 102, 104 and other elements of system 700 including display element 760 and/or other elements (not shown) external to system 700.

System 700 is also shown to include a storage system 740, for example a Hard Disk Drive (HDD) or Solid State Drive (SSD), coupled to the processors and configured to store programs, application and/or data.

System 700 is also shown to include network interface module 770 which may include wireless communication capabilities, such as, for example, cellular communications, Wireless Fidelity (WiFi), Bluetooth®, and/or Near Field Communication (NFC). The wireless communications may conform to or otherwise be compatible with any existing or yet to be developed communication standards including past, current and future version of Bluetooth®, Wi-Fi and mobile phone communication standards.

It will be appreciated that in some embodiments, the various components of the system 700 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for implementing function callback requests between a first processor and a second processor. The following examples pertain to further embodiments.

According to Example 1 there is provided a system for implementing function callback requests between a first processor and a second processor. The system may include a shared virtual memory (SVM) coupled to the first and second processors, the SVM configured to store at least one double-ended queue (Deque). The system of this example may also include an execution unit (EU) of the first processor, the EU associated with a first of the Deques, configured to push the callback requests to the first Deque. The system of this example may further include a request handler thread executing on the second processor configured to: pop one of the callback requests from the first Deque; execute a function specified by the popped callback request; and generate a completion signal to the EU in response to completion of the function.

Example 2 may include the subject matter of Example 1, and the callback request includes: a function pointer to specify the function to be executed by the second processor; and an argument pointer to specify a location in the SVM for data to be provided to the executed function and for results generated by the executed function to be provided to the EU.

Example 3 may include the subject matter of Examples 1 and 2, and the request handler thread is further to pop one of the callback requests from a second Deque, the second Deque associated with a second EU, in response to detecting that the first Deque is empty.

Example 4 may include the subject matter of Examples 1-3, and the Deques are pinned in the SVM to prevent page faults in response to access attempts by the EUs and the request handlers.

Example 5 may include the subject matter of Examples 1-4, and the completion signal is to set a completion flag in the SVM and the EU is further to poll the completion flag.

Example 6 may include the subject matter of Examples 1-5, and the completion signal is to trigger a continuation kernel on the EU, the continuation kernel to restore previously saved stack variables.

Example 7 may include the subject matter of Examples 1-6, and the request handler thread is further to sleep in response to failure to pop one of the callback requests from any of the Deques.

Example 8 may include the subject matter of Examples 1-7, and the sleep includes execution of a Monitor/Mwait instruction.

Example 9 may include the subject matter of Examples 1-8, and the first processor is a Graphics Processor Unit (GPU) and the second processor is a general purpose Central Processor Unit (CPU).

According to Example 10 there is provided a method for function callback requests between a first processor and a second processor. The method may include pushing the callback requests, by an execution unit (EU) of the first processor, to a first double-ended queue (Deque), the Deque stored in a shared virtual memory (SVM) coupled to the first and second processors; popping one of the callback requests from the first Deque, by a request handler thread executing on the second processor; executing, by the request handler thread, a function specified by the popped callback request; and generating, by the request handler thread, a completion signal to the EU in response to completion of the function.

Example 11 may include the subject matter of Example 10, and the callback request includes: a function pointer to specify the function to be executed by the second processor; and an argument pointer to specify a location in the SVM for data to be provided to the executed function and for results generated by the executed function to be provided to the EU.

Example 12 may include the subject matter of Example 10 and 11, and further including popping, by the request handler thread, one of the callback requests from a second Deque, the second Deque associated with a second EU, in response to detecting that the first Deque is empty.

Example 13 may include the subject matter of Examples 10-12, and further including pinning the Deques in the SVM to prevent page faults in response to access attempts by the EUs and the request handlers.

Example 14 may include the subject matter of Examples 10-13, and generating the completion signal further includes setting a completion flag in the SVM for polling by the EU.

Example 15 may include the subject matter of Examples 10-14, and generating the completion signal further includes triggering a continuation kernel on the EU, the continuation kernel to restore previously saved stack variables.

Example 16 may include the subject matter of Examples 10-15, and further including sleeping, by the request handler thread, in response to a failure to pop one of the callback requests from any of the Deques.

Example 17 may include the subject matter of Examples 10-16, and the sleeping further includes execution of a Monitor/Mwait instruction.

According to Example 18 there is provided at least one computer-readable storage medium having instructions stored thereon which when executed by a processor result in the following operations for function callback requests between a first processor and a second processor. The operations may include pushing the callback requests, by an execution unit (EU) of the first processor, to a first double-ended queue (Deque), the Deque stored in a shared virtual memory (SVM) coupled to the first and second processors; popping one of the callback requests from the first Deque, by a request handler thread executing on the second processor; executing, by the request handler thread, a function specified by the popped callback request; and generating, by the request handler thread, a completion signal to the EU in response to completion of the function.

Example 19 may include the subject matter of Example 18, and the callback request includes: a function pointer to specify the function to be executed by the second processor; and an argument pointer to specify a location in the SVM for data to be provided to the executed function and for results generated by the executed function to be provided to the EU.

Example 20 may include the subject matter of Examples 18 and 19, further including popping, by the request handler thread, one of the callback requests from a second Deque, the second Deque associated with a second EU, in response to detecting that the first Deque is empty.

Example 21 may include the subject matter of Examples 18-20, further including pinning the Deques in the SVM to prevent page faults in response to access attempts by the EUs and the request handlers.

Example 22 may include the subject matter of Examples 18-21, and generating the completion signal further includes setting a completion flag in the SVM for polling by the EU.

Example 23 may include the subject matter of Examples 18-22, and generating the completion signal further includes triggering a continuation kernel on the EU, the continuation kernel to restore previously saved stack variables.

Example 24 may include the subject matter of Examples 18-23, further including sleeping, by the request handler thread, in response to a failure to pop one of the callback requests from any of the Deques.

Example 25 may include the subject matter of Examples 18-24, and the sleeping further includes execution of a Monitor/Mwait instruction.

According to Example 26 there is provided a system for function callback requests between a first processor and a second processor. The system may include means for pushing the callback requests, by an execution unit (EU) of the first processor, to a first double-ended queue (Deque), the Deque stored in a shared virtual memory (SVM) coupled to the first and second processors; means for popping one of the callback requests from the first Deque, by a request handler thread executing on the second processor; means for executing, by the request handler thread, a function specified by the popped callback request; and means for generating, by the request handler thread, a completion signal to the EU in response to completion of the function.

Example 27 may include the subject matter of Example 26, and the callback request includes: a function pointer to specify the function to be executed by the second processor; and an argument pointer to specify a location in the SVM for data to be provided to the executed function and for results generated by the executed function to be provided to the EU.

Example 28 may include the subject matter of Examples 26 and 27, further including means for popping, by the request handler thread, one of the callback requests from a second Deque, the second Deque associated with a second EU, in response to detecting that the first Deque is empty.

Example 29 may include the subject matter of Examples 26-28, further including means for pinning the Deques in the SVM to prevent page faults in response to access attempts by the EUs and the request handlers.

Example 30 may include the subject matter of Examples 26-29, and the means for generating the completion signal further includes means for setting a completion flag in the SVM for polling by the EU.

Example 31 may include the subject matter of Examples 26-30, and the means for generating the completion signal further includes means for triggering a continuation kernel on the EU, the continuation kernel to restore previously saved stack variables.

Example 32 may include the subject matter of Examples 26-31, further including means for sleeping, by the request handler thread, in response to a failure to pop one of the callback requests from any of the Deques.

Example 33 may include the subject matter of Examples 26-32, and the means for sleeping further includes means for execution of a Monitor/Mwait instruction.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for implementing function callback requests between a first processor and a second processor, said system comprising:
   a shared virtual memory (SVM) coupled to said first and second processors, said SVM to store at least one double-ended queue (Deque);
   an execution unit (EU) of said first processor, said EU associated with a first of said Deques, to push said callback requests to said first Deque; and
   a request handler thread executing on said second processor to:
   pop one of said callback requests from said first Deque;
   execute a function specified by said popped callback request; and
   generate a completion signal to said EU in response to completion of said function.

2. The system of claim 1, wherein said callback requests comprise:
  a function pointer to specify said function to be executed by said second processor; and
  an argument pointer to specify a location in said SVM for data to be provided to said executed function and for results generated by said executed function to be provided to said EU.

3. The system of claim 1, wherein said request handler thread is further to pop one of said callback requests from a second Deque, said second Deque associated with a second EU, in response to detecting that said first Deque is empty.

4. The system of claim 1, wherein said Deques are pinned in said SVM to prevent page faults in response to access attempts by said EUs and said request handlers.

5. The system of claim 1, wherein said completion signal is to set a completion flag in said SVM and said EU is further to poll said completion flag.

6. The system of claim 1, wherein said completion signal is to trigger a continuation kernel on said EU, said continuation kernel to restore previously saved stack variables.

7. The system of claim 1, wherein said request handler thread is further to sleep in response to failure to pop one of said callback requests from any of said Deques.

8. The system of claim 7, wherein said sleep comprises execution of a Monitor/Mwait instruction.

9. The system of claim 1, wherein said first processor is a Graphics Processor Unit (GPU) and said second processor is a general purpose Central Processor Unit (CPU).

10. A method for function callback requests between a first processor and a second processor, said method comprising:
  pushing said callback requests, by an execution unit (EU) of said first processor, to a first double-ended queue (Deque), said Deque stored in a shared virtual memory (SVM) coupled to said first and second processors;
  popping one of said callback requests from said first Deque, by a request handler thread executing on said second processor;
  executing, by said request handler thread, a function specified by said popped callback request; and
  generating, by said request handler thread, a completion signal to said EU in response to completion of said function.

11. The method of claim 10, wherein said callback requests comprise:
  a function pointer to specify said function to be executed by said second processor; and
  an argument pointer to specify a location in said SVM for data to be provided to said executed function and for results generated by said executed function to be provided to said EU.

12. The method of claim 10, further comprising popping, by said request handler thread, one of said callback requests from a second Deque, said second Deque associated with a second EU, in response to detecting that said first Deque is empty.

13. The method of claim 10, further comprising pinning said Deques in said SVM to prevent page faults in response to access attempts by said EUs and said request handlers.

14. The method of claim 10, wherein generating said completion signal further comprises setting a completion flag in said SVM for polling by said EU.

15. The method of claim 10, wherein generating said completion signal further comprises triggering a continuation kernel on said EU, said continuation kernel to restore previously saved stack variables.

16. The method of claim 10, further comprising sleeping, by said request handler thread, in response to a failure to pop one of said callback requests from any of said Deques.

17. The method of claim 16, wherein said sleeping further comprises execution of a Monitor/Mwait instruction.

18. At least one computer-readable storage medium having instructions stored thereon which when executed by a processor result in the following operations for function callback requests between a first processor and a second processor, said operations comprising:
  pushing said callback requests, by an execution unit (EU) of said first processor, to a first double-ended queue (Deque), said Deque stored in a shared virtual memory (SVM) coupled to said first and second processors;
  popping one of said callback requests from said first Deque, by a request handler thread executing on said second processor;
  executing, by said request handler thread, a function specified by said popped callback request; and
  generating, by said request handler thread, a completion signal to said EU in response to completion of said function.

19. The computer-readable storage medium of claim 18, wherein said callback requests comprise:
  a function pointer to specify said function to be executed by said second processor; and
  an argument pointer to specify a location in said SVM for data to be provided to said executed function and for results generated by said executed function to be provided to said EU.

20. The computer-readable storage medium of claim 18, further comprising popping, by said request handler thread, one of said callback requests from a second Deque, said second Deque associated with a second EU, in response to detecting that said first Deque is empty.

21. The computer-readable storage medium of claim 18, further comprising pinning said Deques in said SVM to prevent page faults in response to access attempts by said EUs and said request handlers.

22. The computer-readable storage medium of claim 18, wherein generating said completion signal further comprises setting a completion flag in said SVM for polling by said EU.

23. The computer-readable storage medium of claim 18, wherein generating said completion signal further comprises triggering a continuation kernel on said EU, said continuation kernel to restore previously saved stack variables.

24. The computer-readable storage medium of claim 18, further comprising sleeping, by said request handler thread, in response to a failure to pop one of said callback requests from any of said Deques.

25. The computer-readable storage medium of claim 24, wherein said sleeping further comprises execution of a Monitor/Mwait instruction.

* * * * *